July 1, 1947.  E. LONGDEN  2,423,195
CLIP FOR FLEXIBLE TUBES
Filed Nov. 25, 1943
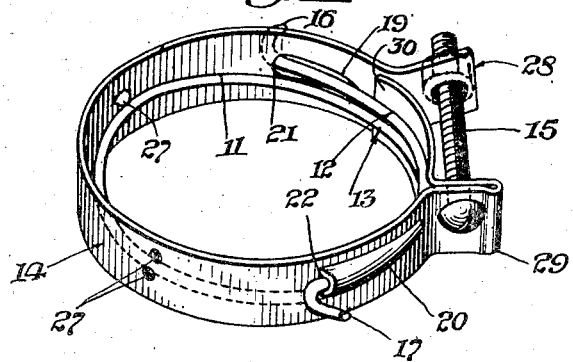
Fig. 1.
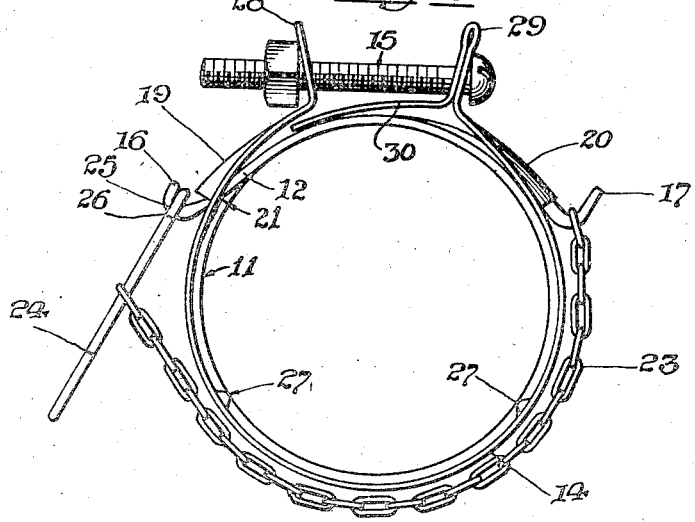
Fig. 2.
Fig. 3.
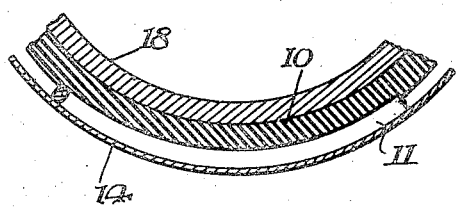
INVENTOR.
Eric Longden
BY Francis E. Boyce
Attorney Patented July 1, 1947

2,423,195

UNITED STATES PATENT OFFICE 2,423,195

CLIP FOR FLEXIBLE TUBES

Eric Longden, Greenside, Johannesburg, Transvaal, Union of South Africa

Application November 25, 1943, Serial No. 511,661
In the Union of South Africa February 5, 1943

5 Claims. (Cl. 24—19)

This invention relates to a clip for making a joint between the end of a flexible tube and a rigid tubular part over which its end is passed.

The object of the invention is to provide a clip with which a good joint between the flexible tube and the rigid tubular part it embraces may be made. A further object is to provide a narrow metallic circular surface over which the clip may move to make the joint without dragging and wrinkling the flexible surface and also to make the joint more easily by exerting the pressure of the clip on a narrow circular portion of the flexible surface.

A preferred form of the invention is shown in the accompanying drawing in which

Fig. 1 is a perspective view of a clip embodying the invention.

Fig. 2 is a side elevation of the same but showing an attachment.

Fig. 3 is an enlarged sectional view illustrating a portion of a rigid tubular member with the flexible tube clamped thereto by the clip shown in Fig. 1.

According to this invention the flexible tube 10, Fig. 3, which may be of rubber, canvas or similar material, is provided at its end, where the joint is to be made, with a springy bracelet 11, for instance, a single coil of wire overlapping at 12, 13 to terminate in ends 16, 17. Over this bracelet 11 any of the usual forms of sheet metal encircling clip 14 may be used and wrapped tightly around the tube 10 to make the joint by tightening bolt 15 joining the outstanding lugs 28, 29 on the ends of the clip 14. The lug 28 is formed at one end of the metal band, and at a point some distance from its opposite end the band is bent upon itself to form the double-walled lug 29 and continued on to form a bridging portion 30 spanning the gap between the lugs 28 and 29.

Without the metal bracelet 11 the clip 14 drags over the periphery of the flexible tube 10 which tends to ruck up. This makes the pressure uneven, the joint is imperfect, and cannot be made tight without excessive strain on the encircling clip 14. By use of the bracelet 11 the clip 14 has a metal surface to slide upon during the tightening-up operation while at the same time the bracelet 11 presses into the surface of the flexible tube 10 which in turn is forced into close contact with the rigid part 18 over which the tube 10 is placed. Thus the joint is made efficiently between the tubes 10 and 18 and without undue tension of the clip 14 or its bolt 15, while the surface of the tube 10 remains unwrinkled.

In a convenient construction the clip 14, in the shape of a metal band having lugs 28, 29, at its ends adapted to accommodate a nut and bolt 15 for drawing them together, has pressings 19, 20 in its wall. Said pressings are perforated at 21, 22, so that the ends 16, 17 of the wire bracelet 11 can easily penetrate and extend beyond the wall of the clip 14 from the inside to the outside and in opposite directions. This construction provides that the wire forming the bracelet 11 has its ends 16, 17 crossed in the clip at 12, 13. The tighter the clip 14 is drawn around tube 10 the further the ends 16, 17 of bracelet 11 extend.

In use the clip 14, carrying on its inside surface the bracelet 11, is opened up to embrace the flexible tube 10 and, when the parts are in proper position to form the joint, the clip 14 is tightened in the ordinary manner, the ends of the wire 16, 17 project further through the pressings 19, 20 and holes 21, 22 as the clip 14 is tightened.

The ends 16, 17 of the wire 11 may, as an initial procedure, be pulled to wrap it tightly on the tube 10 when the parts are in place to make the joint and so avoid any possibility of buckling the wire 11. For this purpose a chain 23 or the like may be connected to the ends 16, 17 to complete the circle of the clip 14. The chain 23 is then tightened in any suitable manner to draw the bracelet tightly onto the tube 10. As shown in Fig. 2 there is provided a lever 24 to which the chain 23 is attached some distance from the end 25 of the lever 24. The end 25 has a hole or slot 26 to engage 16 of the wire bracelet 11. With the two ends 16, 17 of the wire 11 attached to the lever 24 on the latter's rotation as indicated by the dotted lines the bracelet 11 is drawn tightly onto the tube 10 and the nut on the bolt 15 can be easily tightened to draw towards one another the lugs 28, 29 of the clip 14 to effect the required joint.

As shown the wire 11 is retained in position in the clip 14 by small pressings 27 on either side of the wire 11 at appropriate points. If desired the wire 11 can be welded or otherwise secured to the inside wall of the clip 14 at a point opposite its lugs.

As shown in Fig. 3 the inside surface of clip 14 bears on the metallic surface of the wire 11 instead of on the surface of the flexible tube 10 while the wire 11 bites into the surface of the flexible tube 10 and forces it into closer contact with the part 18 thus making a close joint between 10 and 18.

The invention provides a clip for flexible tubes which will effect a joint by an even and concentrated circular and narrow zone of pressure between the flexible tube and the part it embraces.

What I claim as new and desire to secure by Letters Patent is:

1. A hose-clamping device comprising in combination a spring band of such length as nearly to encircle the hose and having means for drawing the ends of the band toward each other, a wire bracelet disposed within said band in position to encircle the hose to be clamped, the ends of said bracelet overlapping each other within the band, portions of said band adjacent its opposite ends being pressed outward to form slots and an arched member extending over each slot and tapering from a point at one end of the slot to an opening at the opposite end, the opposite ends of said bracelet passing through said slots and emerging through the openings at the ends of said tapered members whereby as the ends of the band are drawn together the bracelet is compressed within the band and its ends spread apart in reverse proportion to the distance between the ends of said band.

2. A hose-clamping device as set forth in claim 1, the ends of said bracelet being bent to form hooks outside of said band, a chain removably attached at one end to one of said hooks and passing around said band, and means removably engageable with the other hook and with the opposite end of said chain to urge the same toward said last hook thereby to contract both the band and bracelet.

3. A hose-clamping device as set forth in claim 1, the ends of said bracelet being bent to form hooks outside of said band, a chain removably attached at one end to one of said hooks and passing around said band, and a lever removably engageable with the other hook and with the opposite end of said chain to urge the same toward said last hook thereby to contract both the band and bracelet.

4. A hose-clamping device as set forth in claim 1, the ends of said bracelet being bent over in the form of hooks thereby to engage the ends of the pressed out portions and limit retractile movement of the bracelet ends.

5. A hose-clamping device as set forth in claim 1, said band having means on its inner surface for retaining the bracelet against lateral displacement.

ERIC LONGDEN.

REFERENCES CITED

The following references are of record in the file of this patent:

UNITED STATES PATENTS

| Number | Name | Date |
|---|---|---|
| 473,537 | Weidaw | Apr. 26, 1892 |
| 1,514,411 | Wilkinson | Nov. 4, 1924 |
| 1,748,602 | Hart | Feb. 25, 1930 |